United States Patent Office.

WILLIAM VAN WYCK, OF BELLEVILLE, NEW JERSEY.

Letters Patent No. 65,313, dated May 28, 1867.

---

IMPROVED COMPOSITION FOR FILTERING PETROLEUM, SIRUPS, AND OTHER LIQUIDS.

---

The Schedule referred to in these Letters Patent and making part of the same.

---

TO ALL WHOM IT MAY CONCERN:

Be it known that I, WILLIAM VAN WYCK, of the town of Belleville, county of Essex, State of New Jersey, have invented a new and useful Compound for the Purification and Bleaching of Petroleum and other Oils, Sugars, Sirups and Molasses, and Spirituous Liquors; and I do hereby declare that the following is a full and exact description thereof.

First. Take any animal matter soluble in water, as blood, glue, &c. If the soluble animal matter used be thin and watery, as blood, for instance, then use no water. If the soluble animal matter used be thick and hard, like glue, for instance, then dissolve in water. Take the above-mentioned animal matter and mix it well with pulverized chalk, until the mixture is of the consistency of thin gruel. Then mix the above mixture of soluble animal matter and chalk with finely pulverized wood charcoal, until the compound or mixture is of the consistency of painters' putty.

Second. Then take the above-described compound of soluble animal matter, chalk, and wood charcoal, and place it in a suitable closed vessel; expose the compound to a high heat, until all that is uncharred of the mixture or compound shall be as perfectly charred as charcoal, which is one of the component parts of the above-mentioned compound; that is, carbonize the entire compound at a high heat.

Claim.

I claim the application of the above-mentioned compound of soluble animal matter, chalk, and wood charcoal, for the purification of petroleum and other oils, sugars, sirups and molasses, and spirituous liquors, by filtering these substances through the above-mentioned compound, or by any mode equivalent to filtration.

WILLIAM VAN WYCK.

Witnesses:
CORNS. I. VAN WYCK,
JOHN W. JONES.